United States Patent [19]
Malone

[11] Patent Number: 5,144,859
[45] Date of Patent: Sep. 8, 1992

[54] MULTIPLE POSITION SWIVEL FOR HANDLEBARS

[76] Inventor: Robert D. Malone, P.O. Box 1115, Willow, Ak. 99688

[21] Appl. No.: 314,452

[22] Filed: Feb. 22, 1989

[51] Int. Cl.⁵ .................... B62K 21/12; B62K 21/16; B25G 3/18
[52] U.S. Cl. .................... 74/551.3; 74/551.1; 74/551.4; 403/108; 403/328
[58] Field of Search .................... 74/551.1–551.8; 403/108, 328

[56] References Cited

U.S. PATENT DOCUMENTS

| | | |
|---|---|---|
| 511,479 | 12/1893 | Westbrook . |
| 604,371 | 5/1898 | Cook .................... 74/551.4 |
| 613,970 | 11/1898 | Christy .................... 403/108 |
| 619,126 | 2/1899 | Blashfield . |
| 630,069 | 8/1899 | Paquet .................... 74/551.4 |
| 1,068,158 | 7/1913 | Noack . |
| 2,594,605 | 4/1952 | Zoppelt .................... 403/108 |
| 3,481,218 | 12/1969 | Yoshikawa . |
| 3,505,901 | 4/1970 | Stone .................... 74/551.4 |
| 3,947,140 | 3/1976 | Thomas .................... 403/108 |
| 3,980,409 | 9/1976 | Turner .................... 403/328 X |
| 4,023,436 | 5/1977 | Dodge . |
| 4,085,763 | 4/1978 | Thomas .................... 403/108 X |
| 4,094,330 | 6/1978 | Jong .................... 403/108 X |
| 4,181,230 | 1/1980 | Acuff .................... 403/108 X |
| 4,361,057 | 11/1982 | Kochera . |
| 4,417,745 | 11/1983 | Shomo .................... 74/551.3 |
| 4,729,255 | 3/1988 | Moulton . |

FOREIGN PATENT DOCUMENTS

| | | | |
|---|---|---|---|
| 206600 | 12/1959 | Austria .................... 403/108 |
| 1121346 | 8/1956 | France .................... 403/108 |
| 24471 | 1/1898 | United Kingdom .................... 403/108 |
| 36512 | 2/1898 | United Kingdom .................... 74/551.4 |
| 642417 | 9/1950 | United Kingdom .................... 403/108 |
| 1234390 | 6/1971 | United Kingdom .................... 403/108 |

Primary Examiner—Vinh T. Luong
Attorney, Agent, or Firm—Patrick M. Dwyer

[57] ABSTRACT

Handebars 50 contains one or more swivels 10. Swivel 10 are typically mounted between handelbar segments 11 and 12, and between segments 13 and 11 . Each swivel 10 comprises an inner tube 23, spring loaded buttons 28, adapter tube 31 and outer tube 25. Inner tube 23 is free to rotate within outer tube 25 only when buttons 28 are depressed.

14 Claims, 1 Drawing Sheet

MULTIPLE POSITION SWIVEL FOR HANDLEBARS

TECHNICAL FIELD

This invention relates to the technical field of bicycle parts and accessories, more particularly to a multi-position handlebar swivel.

BACKGROUND OF THE INVENTION

Serious cyclists prefer the conventional drop style handlebar because of the way in which it positions the rider for minimum wind resistance, while maximizing, in that position, muscular interaction between various parts of the torso, arms, and legs during the cycling exercise. In the position normally occupied by a cyclist using drop style handlebars there is considerable strain to the shoulder and arms and particularly to the pressure points of the palms of the hands and of the fingers. In fact it is well known that continuous unrelieved pressure of even relatively short duration to certain areas of the fingers and the palms of the hand can result in temporary or permanent nerve damage.

In order to relieve this stress and to prevent discomfort and potential nerve damage, experienced riders typically shift their hand and arm positions on the conventional drop style handles with great frequency. One popular "rest" position is to lightly place the fingers or palms of one or both hands upon the upper lateral portion of the handlebar just to the right or left of the handlebar stem. However this rest position has a number of disadvantages. Wind resistance increases as the torso of the cyclist is raised to so grip this portion of the handlebars, and control of the bicycle is minimized due to the minimum leverage which can be exercised on so short a grip.

Moreover the conventional drop style handlebars are not ideally suited for other commonly occurring cycling exercise situations, such as strenuous hill climbing or maximum down hill speed. In sum, the cyclist is constrained by the shape of the conventional handlebar to employ various less efficient, less comfortable, less than ideal positions and grips when engaging in the commonly occurring wide variety of cycling activities.

Various specialty handlebars are available for maximizing certain cycling exercises such as mountain trekking, triathalon, time trialing, and so forth. These bars depart from the conventional drop style, but are not adjustable. Numerous ideas have also been proposed for the purpose of effecting adjustable handlebar positional changes. However these ideas in the main require cumbersome, complex, expensive, and difficult to operate apparati and/or they provide only a limited range of angular or attitudinal adjustment.

Accordingly it is an object of the present invention to provide a simple inexpensive means of adjusting the angle and attitude of various portions of the handlebar over a wide range of angles and attitudes.

It is also an object of the invention to provide a means by which the angle or position of a segment of a drop style handlebar may be adjusted with ease and safety while the rider is cycling.

It is a further object of the invention to provide an apparatus which may either be installed at the time that the handlebar is manufactured or which may be retrofitted into any of a number of existing standard drop style handlebars.

SUMMARY OF THE INVENTION

The invention contemplates both a multi-position swivel for handlebars and a set of handlebars incorporating one or more of the swivels. This swivel comprises an inner tube rotatably engaged within an outer tube. This inner tube is approximately ¾ inch (19 mm) longer than the outer tube and has an outer diameter substantially the same as the inner diameter of said outer tube. Both tubes may be made of any commonly available, strong, and easily machinable tubular stock. The inventor has in the past found ordinary plumbing grade ⅝ inch (16 mm) copper tubing quite suitable for the inner tube, with commonly available specification of brass tubing for the outer tube. Other metalliferous tubing stocks will also serve, as will any high strength polymeric plastic tubing.

In a preferred embodiment, aluminum tubing of a 6061-T6 alloy is employed for both inner and outer tubes. This is purchased as "Drawn Seamless 6061-T6 Hydraulic tubing", AMS-4083, from Kilsby-Roberts, Kent, Wash., U.S.A. The outer tube is preferably ¾ inch (16 mm) outside diameter (o.d.) with a 0.058 inch (1.5 mm) well and a 0.634 inch (16 mm) theoretical inside diameter (i.d.). The inner tubing is preferably ⅝ (0.625) inch (16 mm) o.d. The aluminum tubing has the advantage that it can be heliarc or TIG welded to the handlebar for a better finished look and stronger joints. Welding allows the fitting of looser pieces than would other joining methods, so one size swivel can be used for differing ranges of handlebar i.d.'s.

In a preferred embodiment one end of the inner tube protrudes far enough beyond what will become an inserted end of the outer tube to be flared by any well known means for flaring aluminum tubing so that the inner tube may not thereafter be withdrawn through the outer tube in the direction opposite to this inserted end. However, other structures on this end of the inner tube which serve to prevent withdrawal of the inner tube from the outer tube in the indicated direction are also contemplated, such as machined or cast in shoulder type structures, wider o.d. tubing which has been "necked" down to fit inside the outer tube, or adapter rings, such as that described below for the other end of the inner tube. Care should be taken so that the flare of the inner tube thus formed does not have an outer diameter substantially greater than the outer diameter of the outer tube. At the same time the flare must have a diameter which is substantially greater than the inner diameter of the outer tube.

The inner tube is releasably held in a fixed rotational position within the outer tube by means of a spring loaded button mounted within the inner tube and protruding through a hole in the inner tube to a distance substantially greater than the outer diameter of the inner tube. A plurality of corresponding holes designed to receive this protruding button are formed in the outer tube with their centers substantially on a plane which is normal to the axis of the tube, where the position of said plane is selected to allow adequate outer tube stock, between the holes and the inserted end, for insertion into a handlebar section. A preferred spaced is ¾ inch (19 mm), but this dimension, as well as the preferred ¾ inch (19 mm) dimension above disclosed for the protruding end of the inner tube, may be varied as long as structural integrity of the assembled handlebar/swivel/handlebar is assured according to well known engineering standards. The plurality of holes in the outer tube may be radially spaced from one another in any pattern which is adopted for adjustable positioning of one handlebar section with respect to another for various cycling purposes such as down hill speed, up hill climbing, etcetera. In a preferred embodiment four such outer tube holes are radially spaced at approximately 90 degrees from one another. It has been found that this selected spacing effects a beneficial compromise in adjustable position selection of two swivel joined segments of handlebar with respect to one another, while at the same time providing a standardized swivel structure.

Also in a preferred embodiment an inner tube with a diametrically opposed pair of holes is employed and, instead of a single button, a double snap button consisting of a v-shaped piece of light spring steel with the upper end of the "v" "legs" terminating in two button shaped protruberences angled at approximately 90 degrees each from the spring legs. A snap button of this description is available from Valley Tool & Die, Inc., North Royalton, Ohio, U.S.A. VALCO brand double ended snap buttons of either part number D-131 or D-130 are preferred, with optionally available steel inserts crimped inside the otherwise hollow button ends. In an alternative embodiment, a button tube runs between the opposing pair of holes in the inner tube and the button tube has therewith mounted two buttons slidably engaging the tube and thrust apart from one another by coiled spring.

When an embodiment employs a double button system for the inner tube, the outer tube must accommodate the double buttons by having itself one or more pairs of diametrically opposed holes to adjustably accommodate various positions of the handlebar segments with respect to one another as disclosed above for single button systems.

In a preferred embodiment the outer tube has an outer diameter chosen to be substantially the same as the inner diameter of the handlebar section into which it is to be inserted. Where different manufactures of handlebars have differing inner diameters, different o.d. outer tubes may be employed. As disclosed above, welding the aluminum tubing of the preferred embodiment into the handlebar sections will accommodate a significant amount of difference in respective diameters. However, slight differences in diameter may also be accommodated by knurling the outer surface of the outer tube at the insertion point or by adding an adapter tube around the outer diameter of the outer tube to make up for the difference in diameter between the outer tube and the internal diameter of the handlebar. In like manner, the portion of the inner tube protruding from the end of the outer tube opposite the insertion end of the outer tube is the end which is inserted into the adjoining segment of handlebar, and this inner tube may likewise require an adapter tube in order properly to fit into its handlebar section.

Any adapter tubes thus employed on either the inner or the outer tube are to be affixed to the respective tube thus adapted in any of a number of commonly accepted affixation methods such as by epoxy glue, brazing, or welding. Alternatively rivets or machine screws may be driven through handlebar, adapter tube, and the tube being adapted, in order to hold the respective assemblies together. Where a screw or rivet method is employed on an outer tube, care must be taken so that the outer tube neither becomes attached to the inner tube nor binds on the inner tube.

In a preferred standardized swivel embodiment, an adapter tube for the protruding end of the inner tube is made from a shorter section of the same material from which the outer tube is made, said adapter tube needing a length only great enough to insure adequate insertion (approximately ¾ of an inch (19 mm) to match the exposed length of the inner tube) into the adjoining segment of handlebar. This adapter tube preferably has the same outer diameter as the outer tube, so as to comprise a unit easily installed into any given manufacturer's handlebar.

This multi-position swivel in this latter embodiment can be conveniently assembled in advance of use and retained as a standardized unit by flaring the end of the drilled inner tube which opposes the end that will protrude from the outer tube, and then installing a VALCO brand double snap button within the inner tube so that the crotch of the spring's "v" is opposite to the flared end. The pair of buttons thus protruding from the inner tube are then engaged in a pair of holes in the outer tube to establish the relative axial positional relationship of inner tube and outer tube, the adapter tube is slid over the exposed end of the inner tube so that the adapter tube and the outer tube abut one another, and the adapter tube is then welded or braised to the inner tube at the end opposite its abutment to the outer tube.

The preferred method of employing this assembled swivel unit is to insert the outer tube to a depth of approximately ¾ of an inch (19 mm) into a distal segment of handlebar and epoxy glue or braise or weld it therein, and then insert a corresponding proximal segment of the handlebar over the inner tube with its attached adapter tube nearly up to the line of abutment of adapter tube and outer tube and weld, glue or braise that proximal segment to that adapter tube.

This method may be employed during the manufacturing of a swivel equipped handlebar for use as standard accessory equipment on the cycle to be sold, or swivel units may be purchased separately and installed by cyclists who wish to modify their existing, conventional handlebars. However, this is not the only way in which the inventor contemplates that the swivel invention may be used with stock handlebars. Other methods of attaching distal and proximal segments of handlebar to one another with a swivel therebetween will occur to those skilled in the art without departing from the scope of the present invention. For instance, instead of making the outer tube substantially the same outer diameter as the inner diameter of the handlebar, the outer tube may have an inner diameter greater than the outer diameter of the handlebar. Alternatively the tube may have stepped diameters such that the swivel containing portion of the outer tube has a diameter substantially the same as the inner diameter of the handlebar but a wider collar portion of the outer tube has an inner diameter equal to or greater than the outer diameter of the appropriate handlebar. Similarly the inner tube may be so constructed or flared as to have at one end an outer diameter substantially equal to the inner diameter of the outer tube but at the other end has an inner diameter greater than or substantially equal to the outer diameter of the handlebar. In this alternative example, the proximal and distal segments of handlebar would thus be attached to the swivel by inserting the segment ends into the appropriate sockets of the swivel and affixing them by one of the above mentioned means therein. One further alternative method of attachment in any of the above examples is to size the various diameters for press or interference fit.

As mentioned above, the invention also contemplates a set of handlebars comprising therewithin one or more of the above disclosed swivels. Preferably a set of handlebars is contemplated wherein four such swivels are employed. A pair of swivels are symmetrically spaced on either side of the handlebar stem at a distance from the handlebar stem to make them easily reachable with the thumb and fingers of the cyclist's hand while riding and placed so as not to interfere with other accessories or equipment installed on the upper straight lateral portion of the handlebars. Another pair are symmetrically placed in the down curved nearly vertical portion of the dropping handlebar ends, in any case ahead of and above the handlebar grips. As this position of the swivel may necessitate some change in the position of the installation of the brake lever, one possible position is to mount the brake levers just to either side of the handlebar stem, or for those who prefer having the brake levers constantly within reach of the finger tips when the cyclist's hands are on the handlebar grips, the swivels can be installed Just above and ahead of the mounting points of the otherwise conventionally placed brake levers. Various other combinations of positions and placements of these swivels will occur to experienced cyclists and those skilled in the art without departing from the scope of the invention.

As suggested above, these swivels may either be installed in the handlebar at the time of the initial manufacture of the handlebar and bicycle, or these swivels may be purchased by a cyclist and installed after the initial purchase of the bicycle. When the preferred four-hole outer tube embodiment of the swivel is employed in a handlebar in four positions, the handlebar hand grip ends can be positioned in a conventional standard dropped position and in that position the grips may be rotated to flange outwardly for optimum hill climbing, inwardly for optimum downhill and speed, forwardly for an alternate rest position, or backwardly for the standard position. The hand grip ends of the handlebar may then also be rotated by use of the swivels on either side of the handlebars from the standard dropped position to a 180 degree opposed "up" position for an alternate rest position. In that "up" position the handlebars may also be flared inwardly or outwardly for uses which will be apparent to skilled cyclists or the hand grip ends of the handlebar may be rotated to positions intermediate of the "up" or down positions.

DESCRIPTION OF THE PREFERRED EMBODIMENT(S)

Figure 1:
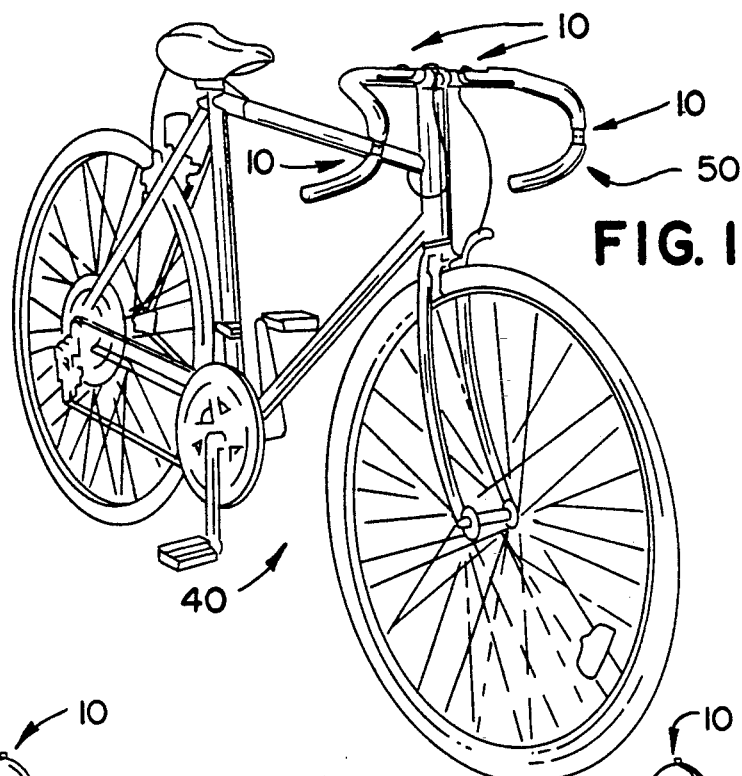
FIG. 1 illustrates a cycle having a conventional drop style handlebar installed which employs four swivels 10.
Figure 2:
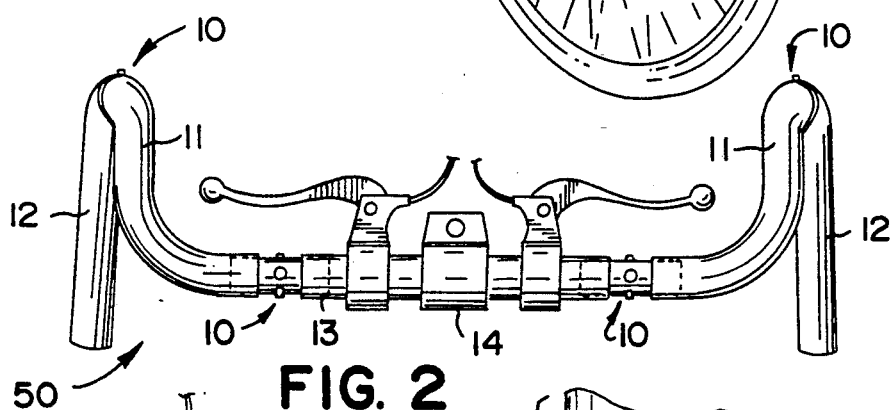
FIG. 2 is a plan view detail from FIG. 1 of the handlebar with swivels.

Referring now to the drawings wherein like numbers indicate like parts, the invention is described in a preferred embodiment. In FIG. 1, a bicycle 40 has installed thereupon a handlebar 50 which has therein four swivels 10. In FIG. 2 handlebar 50 is shown divided by swivels 10 into five segments. A central segment 13 which passes through and is attached to stem 14, two hand grip segments 12 and two intermediate segments 11. This positioning of swivels 10 has been found most suitable by the inventor, however other variations and positions and numbers of swivels will occur to those skilled in the art or experienced in cycling without departing from the scope of the invention.

Figure 3:
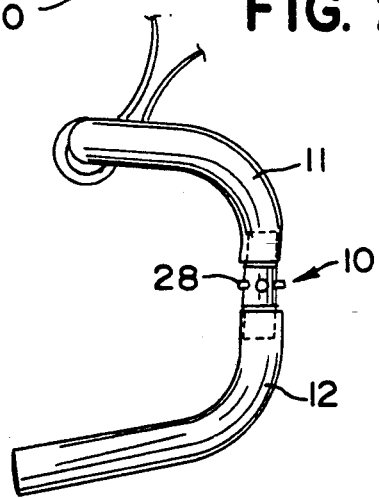
FIG. 3 is a partial side view of the handlebar shown in FIG. 2.

FIG. 3 is a side view of handlebar 50 shown in FIG. 2 illustrating the swivel 10 between intermediate segment 11 and hand grip segment 12 showing that swivel 10 is so installed that button pair 28 points in the same direction as hand grip segment 12 in this preferred embodiment. However embodiments in which buttons 28 and hand grip 12 do not point in the same direction will not depart from the scope of this invention.

Figure 4:
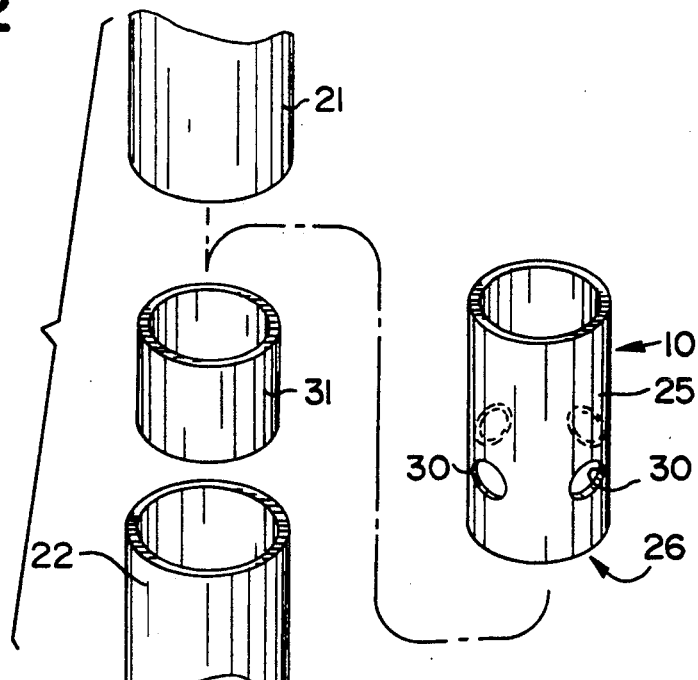
FIG. 4 is an exploded perspective drawing of the swivel as installed within a handlebar.

In FIG. 4 the component parts of swivel 10 are illustrated in exploded perspective. Spring metal 24 having at its terminal ends a pair of buttons 28 is compressed and inserted as illustrated into inner tube 23 so that buttons 28 will engage in opposing pair of holes 29 for ease of assembly. The upper end of inner tube 23 has flare 32 formed preferably prior to assembly. Button and inner tube combination is then inserted into the insertion end 27 of outer tube 25 until flare 32 rests upon insertion end 27. This insertion of inner tube and button combination into outer tube is effected by depressing buttons 28 as they pass insertion end 27. Inner tube 23 is then rotated until buttons 28 pop out one of the pairs of opposing holes 30 in outer tube 25. A portion of inner tube 23 protrudes from beyond abutting end 26 of outer tube 25. That protruding portion of inner tube 23 is then inserted into adapter tube 31 and adapter tube 31 is then affixed as discussed above to the protruding end of inner tube 23 so that the abutting end 26 of outer tube 25 abuts adapter tube 31. In this preferred embodiment insertion end 27 of outer tube 25 is then inserted into distal segment 21 of the sectioned handlebar and the lower portion of inner tube 23 with its attached adapter tube 31 are inserted into proximal segment 22 of the sectioned handlebar and affixed therein by one of the methods discussed above. Depending upon the number of swivels to be used in the handlebar and the relative placement thereof, distal segment 21 and proximal segment 22 may be any of the segments 11, 12, or 13 discussed above. For instance in FIG. 3 intermediate segment 11 relative to swivel 10 would be distal segment 21 and hand grip segment 12 would be proximal segment 22.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

INDUSTRIAL APPLICABILITY

This invention will find utility in the cycling industry. It may be employed either in the manufacturing end of the industry where handlebars and bicycles are manufactured, assembled, and sold, or it may be employed in the accessory end of the industry where accessories are manufactured and sold for after installation on previously purchased bicycles. The invention has the advantage of being simple and inexpensive to manufacture and simple, safe, and convenient of installation and use. In use the invention permits the conversion of a conventional drop style racing handlebar into a handlebar capable of being positioned into a number of alternative rest, hill climb, downhill, etcetera positions to maximize the efficiency of the cycling effort, and the safety, health, and comfort of the rider.

I claim:

1. A swivel for a handle bar comprising:
   a) at least one spring loaded button mounted within, and protruding beyond, an outer circumference of an inner tube;
   b) an outer tube having a plurality of holes radially spaced from one another at regular angular intervals, a center of each of said holes lying substantially on a plane normal to an axis of said outer tube, said holes for receiving said button, said outer tube having an insertion end and an abutting end and said inner tube having, on an end corresponding to said insertion end of said outer tube, an outside diameter greater than an inside diameter of said outer tube, said inner tube rotatably engaged within said outer tube and free to rotate within said outer tube only when said button is depressed, said inner and outer tubes having respective lengths such that said inner tube has a length substantially greater than the length of said outer tube.

2. The apparatus of claim 1 wherein said greater outside diameter is formed by flaring said end of said inner tube corresponding to said insertion end of said outer tube.

3. A handlebar comprising therein at least one of the swivels of claim 2, each of said swivels mounted between a distal section and a proximal section of said handlebar such that depression of said buttons of said swivel permits a rotation of said proximal section with respect to said distal section.

4. The apparatus of claim 3 wherein said rotation of said proximal section with respect to said distal section automatically terminates when said buttons are received within a next successively spaced pair of holes in said outer tube.

5. The apparatus of claim 1 comprising a pair of diametrically opposed spring loaded buttons.

6. The apparatus of claim 5 wherein said outer tube has one or more pairs of diametrically opposed holes therein for receiving said pair of opposed buttons.

7. The apparatus of claim 5 wherein said pair of opposed buttons is comprised of a VALCO brand double snap button, part number D-131.

8. The apparatus of claim 1 wherein said inner tube and said outer tube are comprised of 6061-T6 aluminum alloy.

9. A tubular swivel for retrofit into a bicycle handlebar, in combination with a bicycle handlebar, the combination comprising:

a) an outer tube having a plurality of radially spaced holes disposed about a central axis of said outer tube, said outer tube attachable to a first segment of said handlebar;
   b) an inner tube having at least one spring loaded button therein, said inner tube attachable to a second segment of said handlebar and rotatably engaged within said outer tube and releasably restrained from rotation therein by an engagement of said button within one of said holes;
   wherein said inner tube and said outer tube comprise means to restrain said inner tube from any substantial axial movement with respect to said outer tube when said button is disengaged from any of said holes;
   wherein said outer tube is attachable to said first segment by inserting an insertion end of said outer tube into said first segment; and
   wherein said second segment is a proximal segment with respect to a hand grip portion of said handlebar and said first segment is a distal segment.

10. The apparatus of claim 9 wherein said outer tube further has an inside diameter and an outside diameter and an abutment end opposite said insertion end, and wherein said means to restrain said inside tube from axial movement further comprises:
    a) on an end of said inner tube projecting from said insertion end of said outer tube, an outside diameter greater than said inside diameter of said outer tube, but not greater than said outside diameter of said outer tube, said greater outside diameter on said inner tube substantially abutting said insertion end of said outer tube; and
    b) on an opposite end of said inner tube projecting from said abutment end of said outer tube, an outside diameter greater than said inside diameter of said outer tube, said greater outside diameter on said opposite end of said inner tube abutting said abutment end of said outer tube.

11. The apparatus of claim 10 wherein said greater diameter on said end of said inner tube projecting from said insertion end of said outer tube comprises a flared portion on said end of said inner tube, and wherein said greater diameter on said opposite end of said inner tube comprises an adapter tube attached to said opposite end of said inner tube such that said adapter tube abuts said abutment end of said outer tube.

12. In combination, a conventional drop style handlebar, having at least two downwardly curving portions, and at least one of the swivels of claim 10, such that said proximal segment can be rotated with respect to said distal segment.

13. The apparatus of claim 12 further comprising four of said swivels.

14. The apparatus of claim 13 wherein a symmetrically opposed pair of said swivels are mounted within said downwardly curved portions.

* * * * *